US012727067B2

(12) United States Patent
Hsiao

(10) Patent No.: US 12,727,067 B2
(45) Date of Patent: Sep. 1, 2026

(54) CONTROL CIRCUIT FOR CONTROLLING LIGHT EMITTING ELEMENT

(71) Applicant: ASMedia Technology Inc., New Taipei City (TW)

(72) Inventor: Yu Yi Hsiao, New Taipei City (TW)

(73) Assignee: ASMedia Technology Inc., New Taipei City (TW)

( * ) Notice: Subject to any disclaimer, the term of this patent is extended or adjusted under 35 U.S.C. 154(b) by 14 days.

(21) Appl. No.: 19/079,478

(22) Filed: Mar. 14, 2025

(65) Prior Publication Data

US 2026/0247507 A1 Aug. 20, 2026

(30) Foreign Application Priority Data

Feb. 14, 2025 (TW) ................................ 114105546

(51) Int. Cl.
*H05B 45/30* (2020.01)
*H05B 45/305* (2020.01)
*H05B 45/325* (2020.01)

(52) U.S. Cl.
CPC ......... *H05B 45/305* (2020.01); *H05B 45/325* (2020.01)

(58) Field of Classification Search
CPC ...... H05B 45/10; H05B 45/30; H05B 45/305; H05B 45/325; H05B 47/10
See application file for complete search history.

(56) References Cited

U.S. PATENT DOCUMENTS

2015/0015591 A1* 1/2015 Oh ............................ G06F 3/14 345/519

FOREIGN PATENT DOCUMENTS

| | | | |
|---|---|---|---|
| EP | 3571897 | B1 | 4/2021 |
| TW | 200716389 | A | 5/2007 |
| TW | 201215238 | A1 | 4/2012 |
| TW | M459343 | U1 | 8/2013 |
| TW | 201903747 | A | 1/2019 |

OTHER PUBLICATIONS

"Notice of allowance of Taiwan counterpart Application", issued on Dec. 16, 2025, p. 1-p. 9.

* cited by examiner

*Primary Examiner* — Jimmy T Vu
(74) *Attorney, Agent, or Firm* — JCIPRNET

(57) ABSTRACT

Provided is a control circuit for controlling a light emitting element. The control circuit includes a memory circuit, an operation circuit, and a timer. The operation circuit calculates a unit period according to a set frequency and a quantity of scales of a duty cycle, and generates a unit count value according to an operation frequency and the unit period. The operation circuit stores the unit count value in the memory circuit. The timer controls the operation circuit to generate a control signal according to the unit count value stored in the memory circuit. The operation circuit controls the light emitting element using the control signal. The operation frequency is higher than the set frequency.

12 Claims, 4 Drawing Sheets

CONTROL CIRCUIT FOR CONTROLLING LIGHT EMITTING ELEMENT

CROSS-REFERENCE TO RELATED APPLICATION

This application claims the priority benefit of Taiwan application serial no. 114105546, filed on Feb. 14, 2025. The entirety of the above-mentioned patent application is hereby incorporated by reference herein and made a part of this specification.

BACKGROUND

Technical Field

The disclosure relates to an electronic circuit, and particularly relates to a control circuit for controlling a light emitting element.

Related Art

The light emission of current light emitting elements may be controlled by a control circuit. However, the control circuit generates control signals based on a fixed clock frequency. The frequency and cycle of the control signals cannot be changed. Therefore, the light emission of current light emitting elements is based on a fixed frequency. The light emission mode of the light emitting element is thus limited.

SUMMARY

The disclosure provides a control circuit for controlling a light emitting element, which can generate various control signals.

In an embodiment of the disclosure, the control circuit includes a memory circuit, an operation circuit, and a timer. The operation circuit is coupled to the memory circuit. The operation circuit receives a set frequency and a quantity of scales of a duty cycle, calculates a unit period according to the set frequency and the quantity of scales, and generates a unit count value according to an operation frequency and the unit period. The operation circuit stores the unit count value in the memory circuit. The timer is coupled to the operation circuit. The timer controls the operation circuit to generate a control signal according to the unit count value stored in the memory circuit. The operation circuit controls the light emitting element using the control signal. The operation frequency is higher than the set frequency.

Based on the above, the control circuit calculates a unit period according to the set frequency and the quantity of scales, and generates a unit count value according to the operation frequency and the unit period. The timer receives the unit count value and controls the operation circuit to generate a control signal according to the unit count value. As a result, the control circuit can generate various control signals.

DESCRIPTION OF THE EMBODIMENTS

Figure 1:
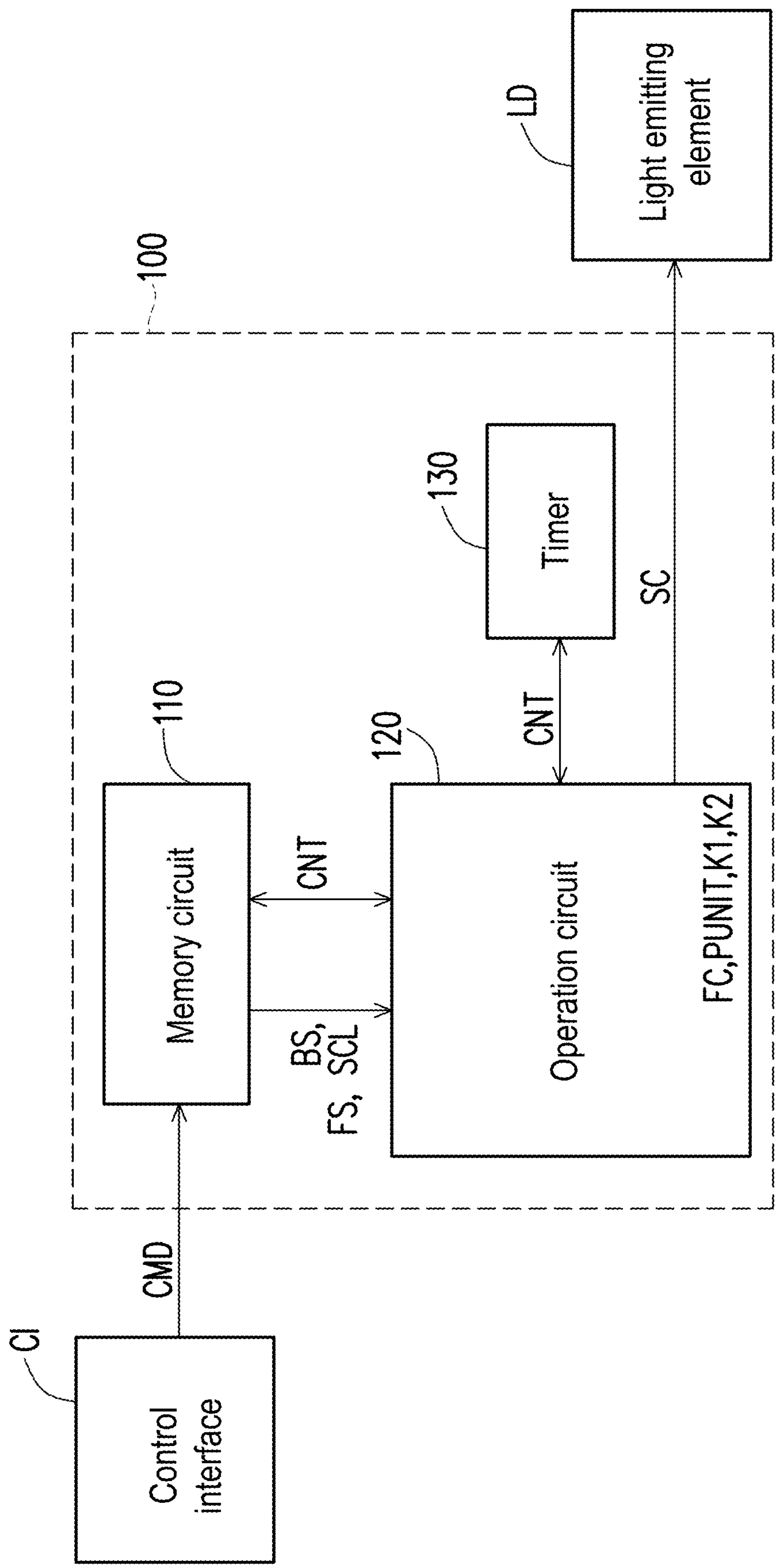
FIG. 1 is a schematic diagram of a control circuit according to an embodiment of the disclosure.

Some embodiments of the disclosure will now be described in detail with reference to the accompanying drawings. In the following description, when the same reference numerals appear in different drawings, the reference numerals will be regarded as the same or similar elements. These embodiments are merely a part of the disclosure and do not disclose all possible implementations of the disclosure. More precisely, these embodiments are merely examples within the scope of the appended claims of the disclosure.

Please refer to FIG. 1, which is a schematic diagram of a control circuit according to an embodiment of the disclosure. In this embodiment, a control circuit 100 includes a memory circuit 110, an operation circuit 120, and a timer 130. The operation circuit 120 is coupled to the memory circuit 110. The operation circuit 120 receives a set frequency FS and a quantity of scales SCL of a duty cycle, calculates a unit period PUNIT according to the set frequency FS and the quantity of scales SCL, and generates a unit count value CNT according to an operation frequency FC and the unit period PUNIT. The operation circuit 120 stores the unit count value CNT in the memory circuit 110. In this embodiment, the operation frequency FC is higher than the set frequency FS.

In this embodiment, the timer 130 is coupled to the operation circuit 120. The timer 130 controls the operation circuit 120 to generate a control signal SC according to the unit count value CNT stored in the memory circuit 110. The operation circuit 120 controls a light emitting element LD using the control signal SC.

It is worth mentioning here that the control circuit 100 calculates the unit period PUNIT according to the set frequency FS and the quantity of scales SCL of the duty cycle, and generates the unit count value CNT according to the operation frequency FC and the unit period PUNIT. The timer 130 receives the unit count value CNT and controls the operation circuit 120 to generate the control signal SC according to the unit count value CNT. Therefore, the control circuit 100 can change the frequency and/or waveform of the control signal SC according to the set frequency FS and the quantity of scales SCL of the duty cycle. As a result, the control circuit 100 can generate various control signals SC.

In this embodiment, the set frequency FS is a frequency applicable to the light emitting element LD. The quantity of scales SCL is equal to a quantity of grayscales applicable to the light emitting element LD. In other words, the quantity of scales SCL is the quantity of different grayscales that the light emitting element LD can realize. For example, if the light emitting element LD is designed to realize 255 levels of brightness, the quantity of scales SCL is equal to "255".

In this embodiment, the set frequency FS and the quantity of scales SCL may be stored in the memory circuit 110. The set frequency FS and the quantity of scales SCL may, for example, be input to the memory circuit 110 by a control interface CI. However, the disclosure is not limited by the source of the set frequency FS and the quantity of scales SCL.

In this embodiment, the operation circuit 120 calculates the unit count value CNT in response to a startup bit BS. For example, the memory circuit 110 provides the startup bit BS in response to an operation command CMD. The operation command CMD may, for example, be provided by the control interface CI. However, the disclosure is not limited by the source of the operation command CMD.

When the operation circuit 120 receives the startup bit BS, the operation circuit 120 receives the set frequency FS and the quantity of scales SCL from the memory circuit 110 in response to the startup bit BS. Next, the operation circuit 120 generates the unit count value CNT according to the set frequency FS, the quantity of scales SCL, and the operation frequency FC.

In this embodiment, when the operation circuit 120 is instructed to generate the control signal SC, the operation circuit 120 reads the unit count value CNT from the memory circuit 110 and provides the unit count value CNT to the timer 130. In some embodiments, the timer 130 may directly receive the unit count value CNT stored in the memory circuit 110.

In this embodiment, the light emitting element LD may include a light emitting unit (not shown) and a drive circuit (not shown) for driving the light emitting unit. The drive circuit may drive the light emitting unit according to the control signal SC. The light emitting unit may be an LED or other elements that can provide output light.

In this embodiment, the memory circuit 110 may be a storage medium capable of storing data. In this embodiment, the operation circuit 120 may be, for example, a Central Processing Unit (CPU), or other programmable general-purpose or special-purpose microprocessors, a Digital Signal Processor (DSP), a programmable controller, an Application Specific Integrated Circuit (ASIC), a Programmable Logic Device (PLD), or other similar devices.

Figure 2:
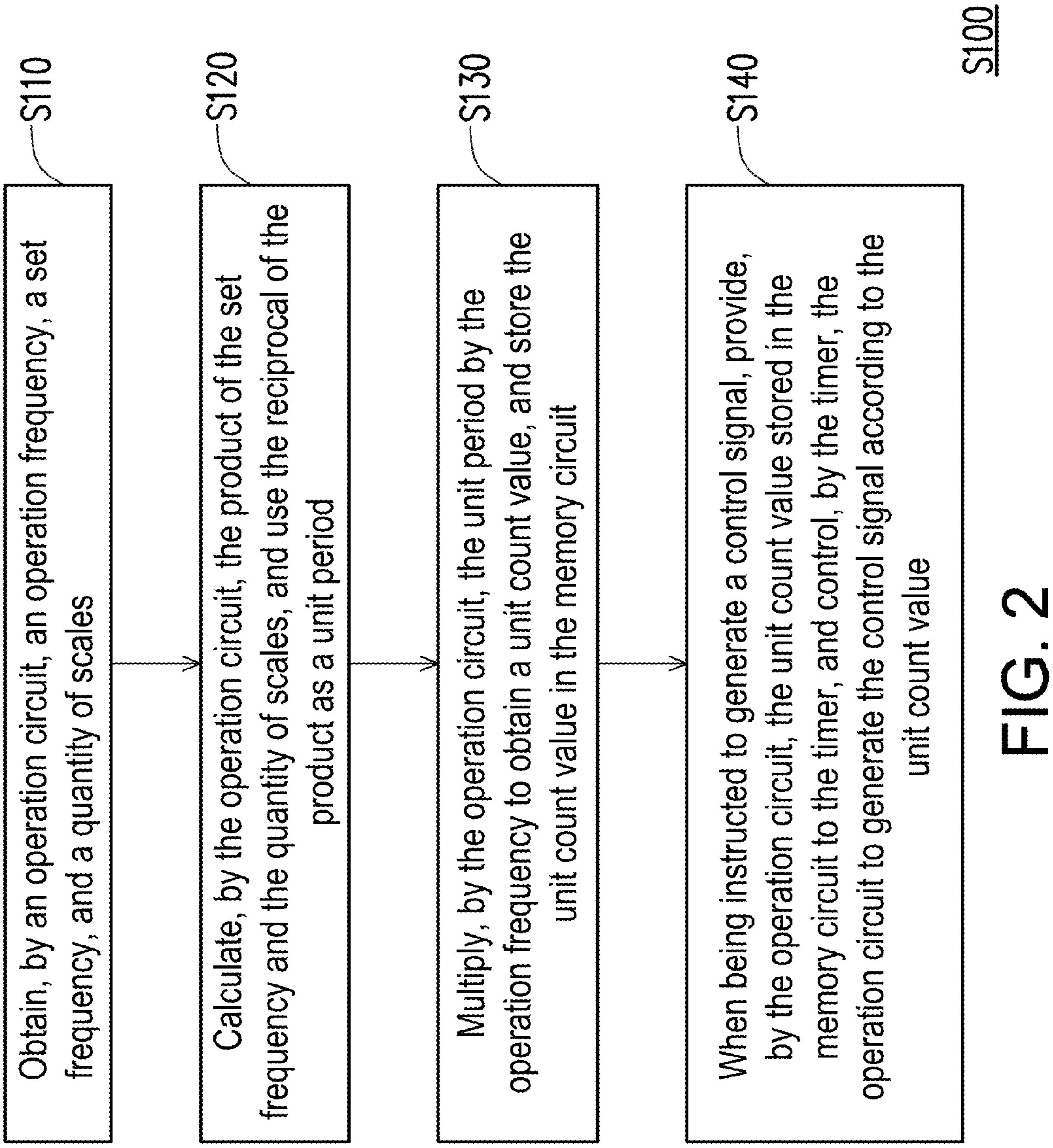
FIG. 2 is an operation flow chart of the control circuit according to an embodiment of the disclosure.

Please refer to FIG. 1 and FIG. 2. FIG. 2 is an operation flow chart of the control circuit according to an embodiment of the disclosure. In this embodiment, an operation flow S100 includes Steps S110 to S140. In Step S110, the operation circuit 120 obtains the operation frequency FC, the set frequency FS, and the quantity of scales SCL. Furthermore, in this embodiment, the operation frequency FC may be the clock frequency of the operation circuit 120. Therefore, the operation circuit 120 itself may know the operation frequency FC. In addition, when the operation circuit 120 receives the startup bit BS, the operation circuit 120 receives the set frequency FS and the quantity of scales SCL from the memory circuit 110 in response to the startup bit BS.

In Step S120, the operation circuit 120 calculates the product of the set frequency FS and the quantity of scales SCL, and uses the reciprocal of the product as the unit period PUNIT. Specifically, the operation circuit 120 may obtain the unit period PUNIT according to Formula (1).

$$PUNIT = \frac{1}{(FS \times SCL)} \qquad \text{Formula (1)}$$

For example, the set frequency FS is equal to 30 KHz (while the disclosure is not limited thereto). The quantity of scales SCL is equal to "255". Therefore, the unit period PUNIT is equal to 130.7 nanoseconds (ns).

In Step S130, the operation circuit 120 divides the unit period PUNIT by the reciprocal of the operation frequency FC to obtain the unit count value CNT.

$$CNT = PUNIT \div \frac{1}{FC} \qquad \text{Formula (2)}$$

In other words, the operation circuit 120 multiplies the unit period PUNIT by the operation frequency FC to obtain the unit count value CNT. Specifically, the operation circuit 120 may obtain the unit count value CNT according to Formula (2).

For example, the operation frequency FC is equal to 60 MHz (while the disclosure is not limited thereto). The unit period PUNIT is equal to 130.7 ns. Therefore, the unit count value CNT is equal to "7.84". The unit count value CNT may be approximated to an integer value. Thus, the unit count value CNT is approximated to "8".

In Step S130, the operation circuit 120 stores the unit count value CNT in the memory circuit 110.

In Step S140, when the operation circuit 120 is instructed to generate the control signal SC, the operation circuit 120 reads the unit count value CNT from the memory circuit 110 and provides the unit count value CNT to the timer 130. Furthermore, the timer 130 controls the operation circuit 120 to generate the control signal SC according to the unit count value CNT.

For example, the control signal SC is a pulse-width modulation (PWM) signal. The unit count value CNT corresponds to the pulse width difference between adjacent grayscales of the control signal SC. The timer 130 may trigger the operation circuit 120 according to the unit count value CNT, causing the operation circuit 120 to provide a high voltage value based on a first cycle of at least one unit count value CNT to generate the high voltage value portion of the control signal SC, and to provide a low voltage value based on a second cycle of at least one unit count value CNT to generate the low voltage value portion of the control signal SC.

For example, the more multiples of the unit count value CNT corresponding to the high voltage value and the more multiples of the unit count value CNT corresponding to the low voltage value, the lower the frequency of the control signal SC. The fewer multiples of the unit count value CNT corresponding to the high voltage value and the fewer multiples of the unit count value CNT corresponding to the low voltage value, the higher the frequency of the control signal SC.

For example, the unit count value CNT is equal to "8". The operation frequency FC may be the clock frequency of the operation circuit 120. Therefore, the pulse width difference between adjacent grayscales of the control signal SC is equal to 8 times the period of the clock of the operation circuit 120. In other words, when the grayscale corresponding to the control signal SC increases by "1", the width of the positive pulse of the control signal SC increases by 8 times the period of the clock of the operation circuit 120. When the grayscale corresponding to the control signal SC increases by "2", the width of the positive pulse of the control signal SC increases by 16 times the period of the clock of the operation circuit 120.

It should be noted that the control circuit 200 may utilize the operation frequency FC and the unit count value CNT to implement the control signal SC with the set frequency FS. Once the set frequency FS and/or duty cycle of the control signal SC is changed, the control circuit 200 may correspondingly change the unit count value CNT to implement the control signal SC with the set frequency FS.

Figure 3:
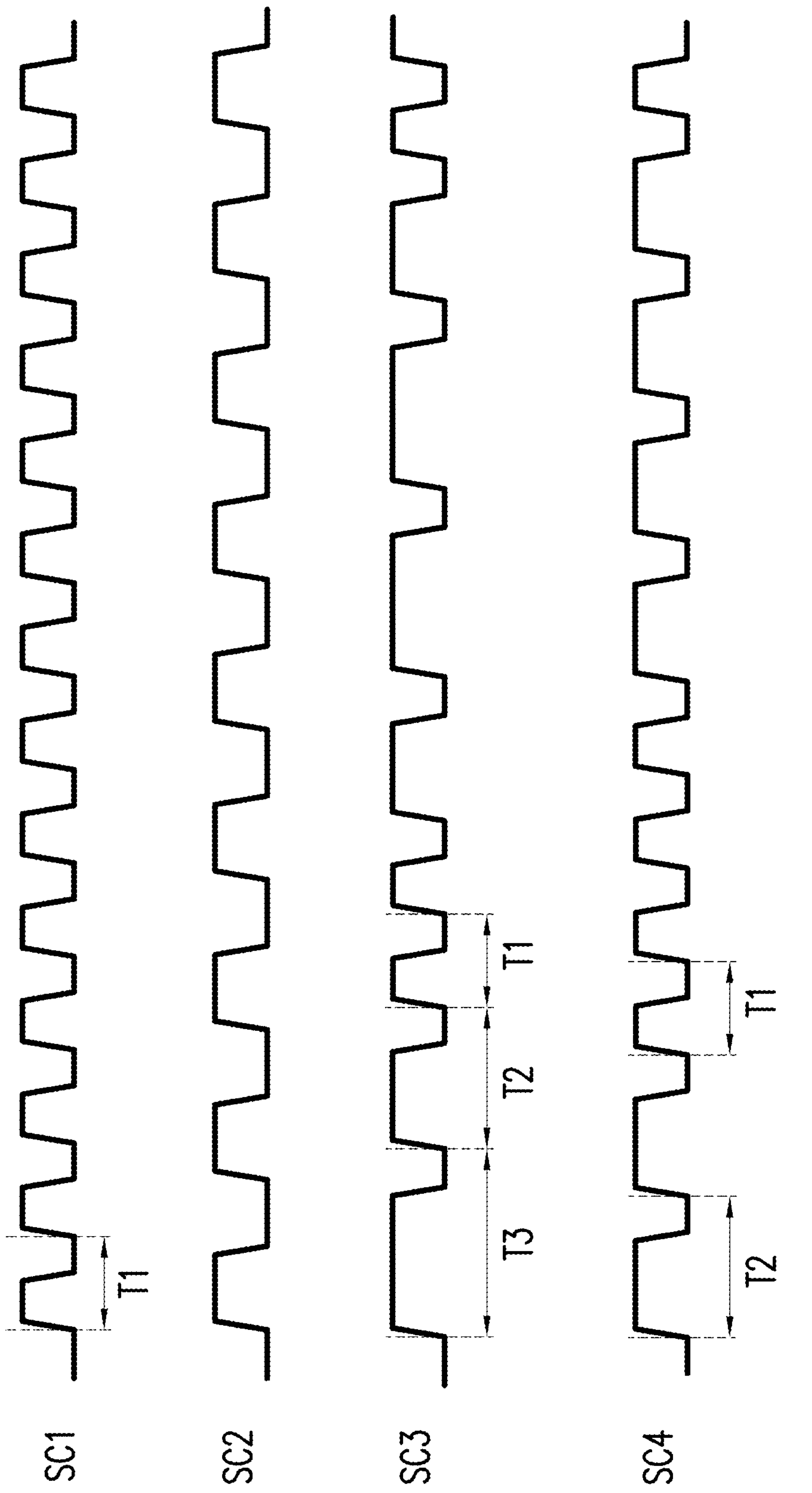
FIG. 3 is a waveform diagram of control signals according to an embodiment of the disclosure.

Please refer to FIG. 1 and FIG. 3. FIG. 3 is a waveform diagram of control signals according to an embodiment of the disclosure. In this embodiment, FIG. 3 shows control signals SC1 to SC4. The control signal SC1 has a fixed duty cycle and frequency. The operation circuit 120 fixes a first multiple K1 of the unit count value CNT and changes a second multiple K2 of the unit count value CNT to alter the duty cycle of the control signal SC1, thereby determining the grayscale of the light emitting element LD. The first multiple K1 is greater than the second multiple K2. The second multiple K2 is associated with a time duration of a high voltage level of the control signal SC1. For example, the set frequency FS is equal to 30 KHz. The operation frequency FC is equal to 60 MHz. The quantity of scales SCL is equal to "255". Therefore, the initial first multiple K1 is, for example, equal to "2000". The second multiple K2 is, for example, one of "1" to "255". Thus, according to the unit count value CNT, the operation circuit 120 can flexibly adjust the waveform of the control signal SC1 to generate the control signals SC2 to SC4. In this embodiment, at least one of the first multiple K1 and the second multiple K2 of the control signal SC1 can be adjusted over time to generate new control signals.

For example, the operation circuit 120 changes the first multiple K1 of the unit count value CNT to alter the cycle of the control signal SC1, thereby generating the control signal SC2. For example, the operation circuit 120 increases the first multiple K1 of the unit count value CNT to generate the control signal SC2. Consequently, the cycle of the control signal SC2 is longer than the cycle of the control signal SC1.

For example, the operation circuit 120 changes both the first multiple K1 and the second multiple K2 of the unit count value CNT to generate the control signal SC3. The cycle of the control signal SC3 is altered from a cycle T3 to a cycle T2, and then from the cycle T2 to a cycle T1. Subsequently, after multiple cycles T1, the cycle of the control signal SC3 is altered from the cycle T1 to the cycle T2, and then from the cycle T2 to the cycle T3. The cycle T3 is shorter than the cycle T2. The cycle T2 is shorter than the cycle T1. Moreover, the duty cycle corresponding to the cycle T3 is higher than the duty cycle corresponding to the cycle T2. The duty cycle corresponding to the cycle T2 is higher than the duty cycle corresponding to the cycle T1. As a result, the control signal SC3 provides 3 stages of grayscale and cycle, thereby presenting a 3-stage breathing light effect.

The operation circuit 120 changes both the first multiple K1 and the second multiple K2 of the unit count value CNT to generate the control signal SC4. The cycle of the control signal SC4 is altered from the cycle T1 to the cycle T2, and after multiple cycles T2, is changed back to the cycle T1. Subsequently, after multiple cycles T1, the cycle of the control signal SC4 is altered to the cycle T2 again. As a result, the control signal SC4 provides 2 stages of grayscale and cycle, thereby presenting a 2-stage breathing light effect.

Figure 4:
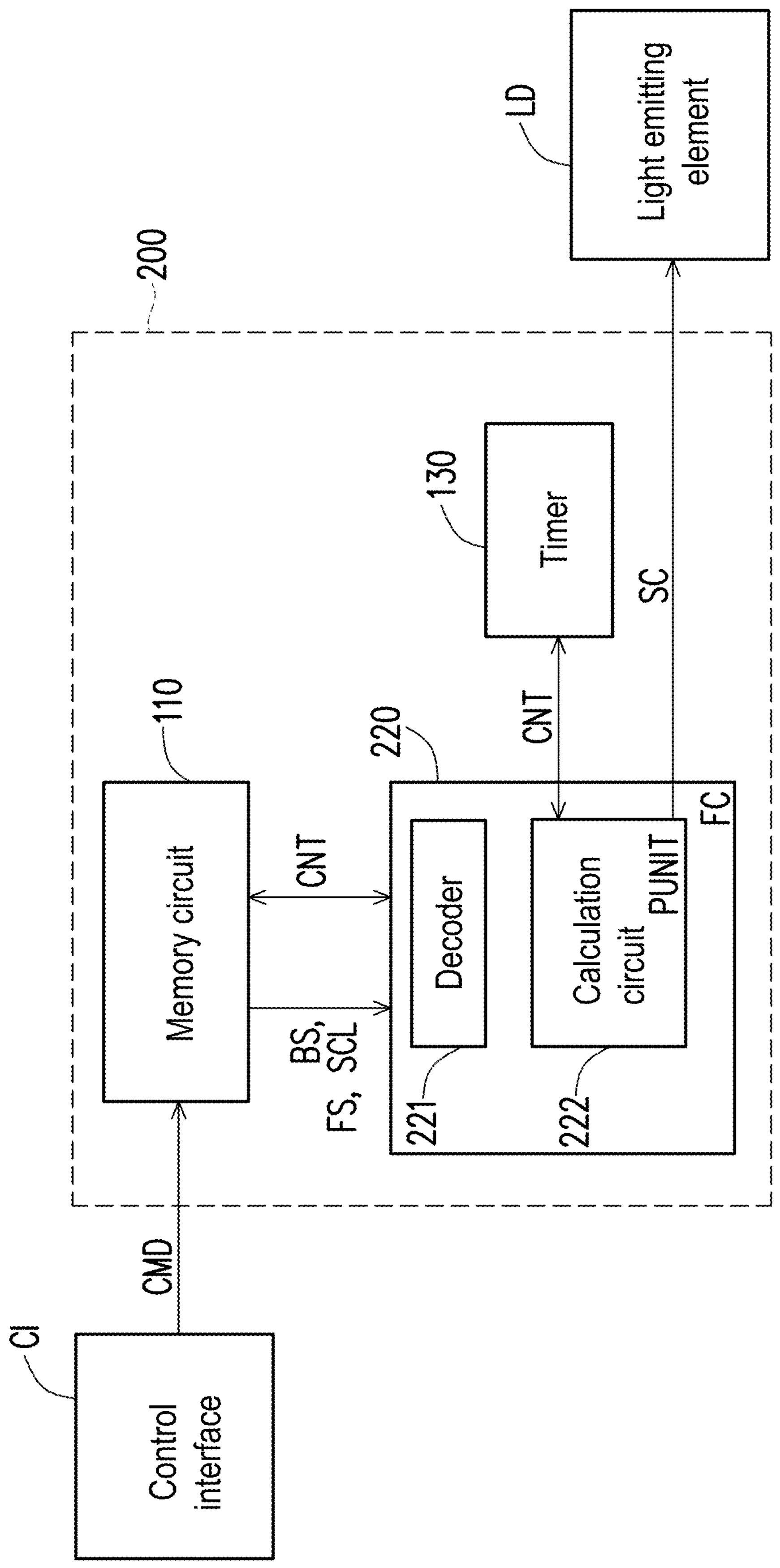
FIG. 4 is a schematic diagram of the control circuit according to an embodiment of the disclosure.

Please refer to FIG. 4, which is a schematic diagram of the control circuit according to an embodiment of the disclosure. In this embodiment, a control circuit 200 includes a memory circuit 110, an operation circuit 220, and a timer 130. The operation circuit 220 includes a decoder 221 and a calculation circuit 222. The decoder 221 is coupled to the memory circuit 110. When receiving the startup bit BS, the decoder 221 receives the set frequency FS and the quantity of scales SCL from the memory circuit 110. The calculation circuit 222 is coupled to the decoder 221 and the timer 130. The calculation circuit 222 calculates the unit period PUNIT, and generates the unit count value CNT according to the operation frequency FC and the unit period PUNIT.

When receiving the startup bit BS, the decoder 221 provides the set frequency FS and the quantity of scales SCL to the calculation circuit 222. The calculation circuit 222 generates the unit count value CNT and stores the unit count value CNT in the memory circuit 110. When the operation circuit 220 is instructed to generate the control signal SC, the calculation circuit 222 reads the unit count value CNT from the memory circuit 110 and provides the unit count value CNT to the timer 130. As a result, the timer 130 controls the calculation circuit 222 to generate the control signal SC based on triggering of the unit count value CNT. The calculation circuit 222 provides the control signal SC to the light emitting element LD.

In summary, the control circuit calculates the unit period according to the set frequency and the quantity of scales, and generates the unit count value according to the operation frequency and the unit period. The timer controls the operation circuit to generate the control signal according to the unit count value. As a result, the control circuit can generate various control signals.

Although the disclosure has been disclosed by the above embodiments, the embodiments are not intended to limit the disclosure. Persons skilled in the art may make some changes and modifications without departing from the spirit and scope of the disclosure. Therefore, the protection scope of the disclosure should be defined by the appended claims.

What is claimed is:

1. A control circuit for controlling a light emitting element, comprising:
- a memory circuit;
- an operation circuit coupled to the memory circuit, and configured to receive a set frequency and a quantity of scales of a duty cycle, to calculate a unit period according to the set frequency and the quantity of scales, to generate a unit count value according to an operation frequency and the unit period, and to store the unit count value in the memory circuit; and
- a timer coupled to the operation circuit, and configured to control the operation circuit to generate a control signal according to the unit count value stored in the memory circuit,
- wherein the operation circuit controls the light emitting element using the control signal, and
- the operation frequency is higher than the set frequency.

2. The control circuit as claimed in claim 1, wherein the set frequency is a frequency applicable to the light emitting element.

3. The control circuit as claimed in claim 1, wherein the quantity of scales is equal to a quantity of grayscales applicable to the light emitting element.

4. The control circuit as claimed in claim 1, wherein the set frequency and the quantity of scales are stored in the memory circuit.

5. The control circuit as claimed in claim 4, wherein
- the memory circuit provides a startup bit in response to an operation command, and
- the operation circuit receives the set frequency and the quantity of scales from the memory circuit in response to the startup bit.

6. The control circuit as claimed in claim 5, wherein the operation circuit comprises:
- a decoder coupled to the memory circuit, and configured to receive the set frequency and the quantity of scales from the memory circuit in response to receiving the startup bit.

7. The control circuit as claimed in claim 6, wherein the operation circuit further comprises:
- a calculation circuit coupled to the decoder and the timer, and configured to calculate the unit period, and to generate the unit count value according to the operation frequency and the unit period, wherein the timer controls the calculation circuit to generate the control signal based on triggering of the unit count value.

8. The control circuit as claimed in claim 1, wherein in response to the operation circuit being instructed to generate the control signal, the operation circuit reads the unit count value from the memory circuit, and provides the unit count value to the timer.

9. The control circuit as claimed in claim 1, wherein the operation circuit calculates a product of the set frequency and the quantity of scales, and uses a reciprocal of the product as the unit period.

10. The control circuit as claimed in claim 9, wherein the operation circuit multiplies the unit period by the operation frequency to obtain the unit count value.

11. The control circuit as claimed in claim 1, wherein the operation circuit changes a first multiple of the unit count value to alter a cycle of the control signal.

12. The control circuit as claimed in claim 11, wherein the operation circuit fixes the first multiple of the unit count value and changes a second multiple of the unit count value to alter a duty cycle of the control signal, thereby determining a grayscale of the light emitting element, the first multiple is greater than the second multiple, and the second multiple is associated with a time duration of a high voltage level of the control signal.

* * * * *